(No Model.) 3 Sheets—Sheet 2.
B. T. MULLIGAN.
TYPE WRITING MACHINE.

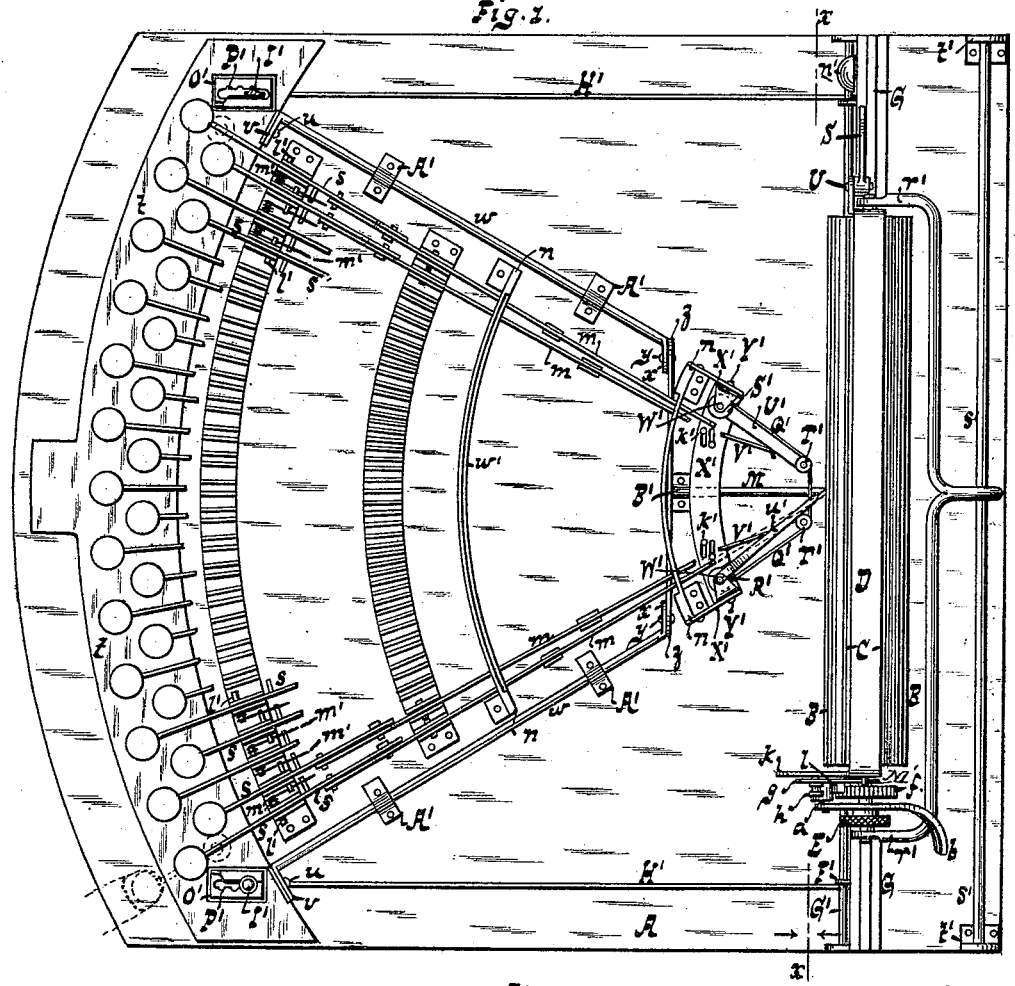

No. 449,560. Patented Mar. 31, 1891.

WITNESSES:
William Miller
Edward Wolff

INVENTOR:
Bartley T. Mulligan.
BY
Van Santvoord & Hauff
ATTORNEYS (No Model.)   3 Sheets—Sheet 3.

B. T. MULLIGAN.
TYPE WRITING MACHINE.

No. 449,560. Patented Mar. 31, 1891.

WITNESSES:
William Miller
Edward Wolff

INVENTOR:
Bartley T. Mulligan.
BY Van Santvoord & Hauff
ATTORNEYS

UNITED STATES PATENT OFFICE.

BARTLEY T. MULLIGAN, OF BROOKLYN, NEW YORK.

TYPE-WRITING MACHINE.

SPECIFICATION forming part of Letters Patent No. 449,560, dated March 31, 1891.

Application filed August 7, 1890. Serial No. 361,242. (No model.)

*To all whom it may concern:*

Be it known that I, BARTLEY T. MULLIGAN, a citizen of the United States, residing at Brooklyn, in the county of Kings and State of New York, have invented new and useful Improvements in Type-Writing Machines, of which the following is a specification.

This invention relates to improvements in type-writing machines; and the invention consists in the details of construction set forth in the following specification and claims, and illustrated in the accompanying drawings, in which—

Figure 3:
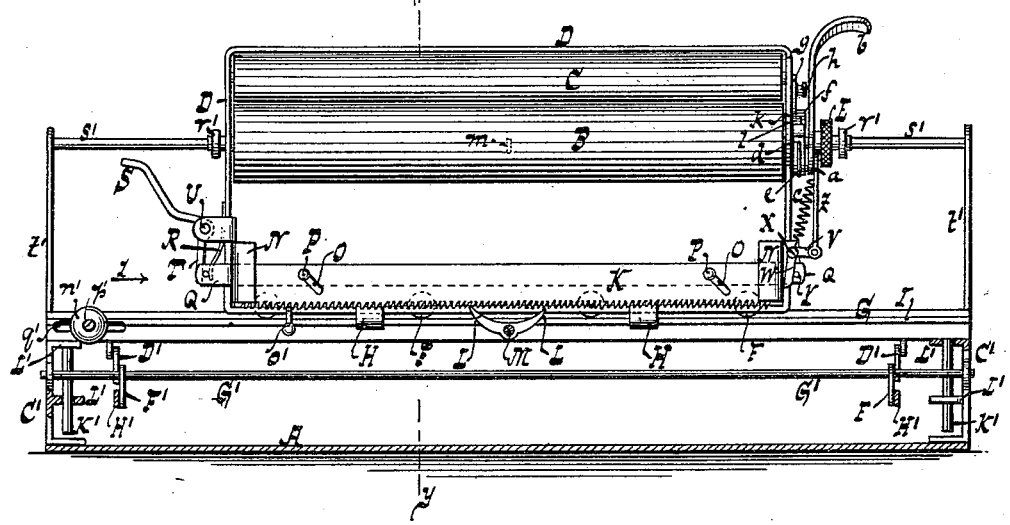
Figure 4:
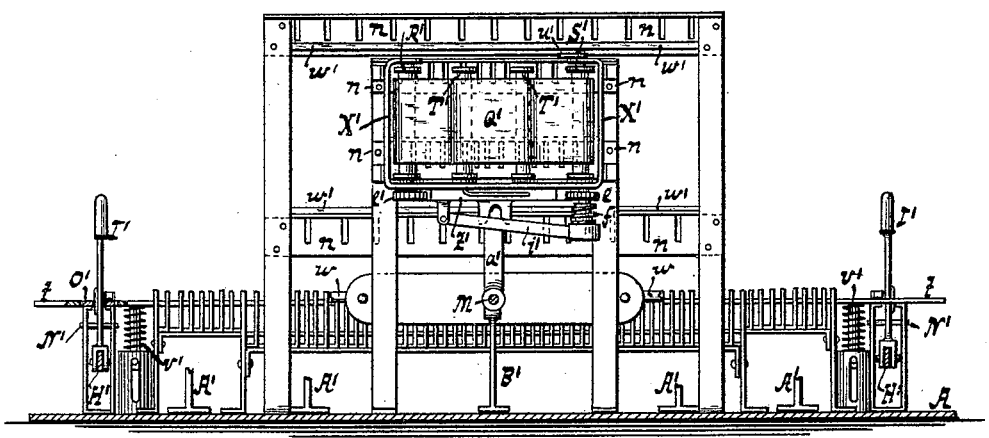
Figure 5:
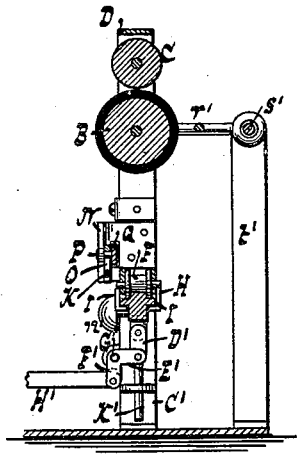
Figure 6:
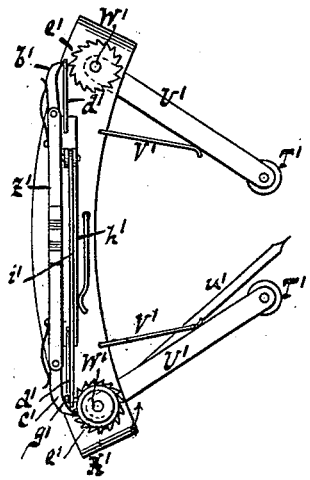
Figure 7:
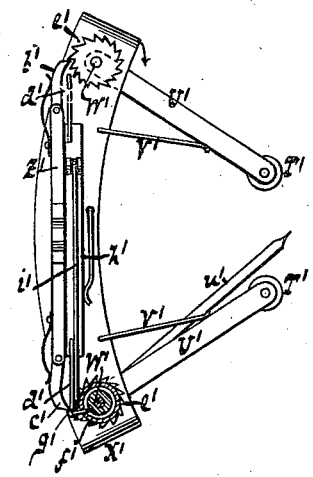
Figure 8:
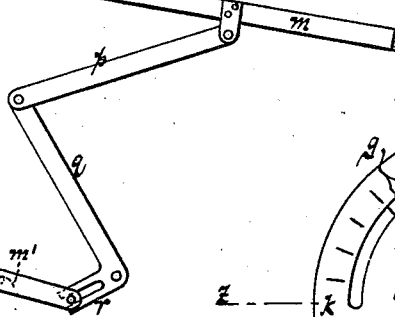
Figure 11:
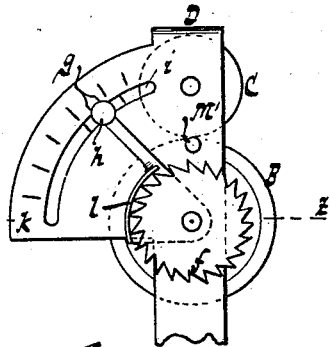
Figure 10:
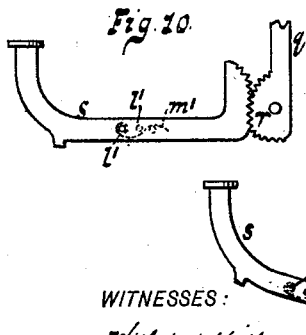
Figure 9:
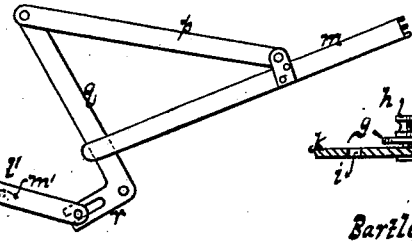
Figure 12:
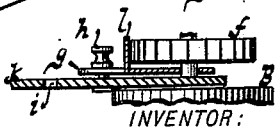

Figure 1 is a plan view of a type-writing machine containing my invention. Fig. 2 is a side elevation of Fig. 1. Fig. 3 is a section along $x\,x$, Fig. 1, looking toward the platen. Fig. 4 is a section similar to Fig. 3, looking toward the type-bars. Fig. 5 is a section along $y\,y$, Fig. 3. Fig. 6 is an inverted plan view of the ribbon-feeding device. Fig. 7 is a similar view to Fig. 6 with parts in a different position than in Fig. 6. Fig. 8 is a detail view of an upper type-bar and actuating parts. Fig. 9 is a similar view of a lower type-bar. Fig. 10 is a detail view of a modification. Fig. 11 is a side view of the adjusting-shield for the rotating ratchet of the platen. Fig. 12 is a section along $z\,z$ of Fig. 11.

In the drawings, the letter A indicates a base or support, and B is the platen or paper-supporting roller. A roller C holds the paper snugly against the platen, the paper being fed between the platen and said roller. The axles of the platen and roller C are supported in a frame D. A finger-button E enables the platen to be rotated when a fresh sheet of paper is to be adjusted between the platen and roller C.

The frame D is supported on rollers F, adapted to travel along the track G, so that the platen can be fed back and forth. The frame D has lugs or hooks H catching over shoulders I, projecting from the track G, so that the rollers F will not run off the track. The frame D has a feed-rack K engaged by a feed-dog or teeth L L, oscillated by a rock-shaft M. As the teeth L L are oscillated first one of said teeth and then the other engages the rack K, so as to allow the frame D and platen B to advance step by step as the writing progresses. The usual well-known spring-drum (not shown) can be used to draw the platen-frame forward.

The rack K, whenever required, can be lifted out of engagement with the dog L L, said rack being capable of vertical movement in guides N, Fig. 3, secured to frame D. Said rack has inclined slots O, into which enter studs P, projecting from a slide Q, mounted in frame D. When the spring R holds the slide Q in the position shown in Fig. 3, the the rack K is depressed, so as to be in position to be engaged by one or another of the teeth L. When the slide Q Q is pressed in the direction of arrow 1 against the resistance of spring R, the studs P, sliding along the inclined slots O, lift the rack out of engagement with the teeth L L, so that the frame D with the platen can be set to any desired starting-point from whence it is desired to begin writing.

The slide Q can be actuated by a lever S T, having its fulcrum U secured to any suitable point of the frame D. When the arm S of said lever is depressed, the lever-arm T presses the slide Q in the direction of arrow 1 to move the rack K to its releasing position. When the lever S T is released, the spring R moves the slide Q back to the starting-point, so that the rack K returns to its engaging position. The slide Q can also be actuated by the bell-crank lever V W, fulcrumed at X to the frame D. The lever-arm W strikes against a stud Y on slide Q. A link Z connects the lever V W to the lever $a\,b$, fulcrumed on the axle of platen B. When the lever-arm $b$ is depressed, the lever-arm $a$ pulls on link Z, so that the lever V W is actuated to move the slide Q in the direction of arrow 1 and to move the rack K to its releasing position. When the lever $a\,b$ is released, the spring R returns the slide Q to its starting-point. A spring $c$ returns the lever $a\,b$ to its starting-point when said lever is released. The lever $a\,b$ when actuated also rotates the platen B by means of the following mechanism: The lever-arm $a$ carries a pawl $d$, pressed by a spring $e$ against a ratchet $f$ on the axle of the platen. When the lever-arm $b$ is depressed, the lever-arm $a$ actuates the pawl $d$ so as to rotate the ratchet $f$ and platen B, so that the paper on the platen is moved into position to start a new line of writing. It is thus readily noticed that when the frame is to be shifted without rotating the platen the lever S T is employed, while if the frame D is to be shifted and at the same time the platen to be rotated the lever $a\ b$ is employed, and if the platen is to be rotated without shifting the frame D the finger-button E is employed.

The lever $a\ b$ can be made to rotate the platen more or less, according as the interlinear space is to be greater or smaller. On the axle of the platen is loosely mounted an arm or pointer $g$, having a set-screw $h$, which can be clamped in a slot $i$ in the plate $k$, projecting from the frame D. This pointer $g$ carries a shield or plate $l$, and by shifting the pointer the shield $l$ is carried more or less into the path of the pawl $d$. Said shield, resting between the pawl and the ratchet $f$, prevents the pawl from engaging and rotating the ratchet, and as said shield is shifted, so as to cover more or less of those teeth of the ratchet which lie in the path of the pawl, the pawl at each throw engages the ratchet farther from or nearer to the beginning of its throw, thus rotating the ratchet more or less, according as the platen B is to be turned more or less, A stud or stop M', Figs. 1 and 2, limits the forward throw of the pawl. The plate $k$ can be provided with an index, so as to show the place where the pointer $g$ is to be fixed for securing a desired interlinear spacing by each throw of the pawl $d$.

The type-bars $m$ are supported by the guides $n$. These guides are concentrically arranged, so that the type-bars $m$ radiate to a common point. By arranging the type-bars in two layers or tiers, one higher than the other, as shown in the drawings, a large number of type-bars can be arranged in a small and compact space. To each type-bar is jointed a link $p$, which is also jointed to a bell-crank lever $q\ r$, actuated by a key-lever $s$. By depressing a key-lever $s$ the corresponding type-bar is projected toward the platen, so as to produce an impression.

The spacing-key $t$ extends along under the key-levers $s$, so that when a key-lever is depressed said key-lever presses on and actuates the spacing-key. Said spacing-key, however, if desired, can be actuated directly without actuating a key-lever when, for example, it is desired to space without printing. At or near its center the spacing-key may have a lip or projection, onto which the operator can readily press. The spacing-key is jointed or pivoted at $u$ to arms $v$, Fig. 1, extending from rock-shafts $w$. The rock-shafts $w$ have arms $x$ jointed or pivoted at $y$ to arms $z$, extending from the rock-shaft M. When the spacing-key is depressed, the arms $v$ are swung or drawn down at their free ends, so as to rock the shafts $w$ and arms $x\ y$, whereby the rock-shaft M is rocked, so as to actuate the dog L L, whereby the feed-rack K and platen B are fed along. The shafts $w$ are supported by suitable journals or bearings A', and the rock-shaft M has a similar bearing B'.

Each type-bar $m$ is shown as having three types, one above the other. By making the platen B vertically adjustable one type or another can be made to act against the platen, as desired. The track G of the platen-frame D is made vertically adjustable in its supports C'. Links D', Fig. 2, connect the track G to bell-crank levers E' F', fulcrumed on the rod or pivot G'. A slide-rod H', having an actuating-lever I', fulcrumed at N', is provided for each bell-crank lever. If the platen B is in its lowest position, the bottom type on each type-bar will print. By actuating lever I' so as to move a slide-rod H' a certain distance toward the platen the latter is raised to make the next highest type come into action, and by raising the platen still higher the highest type will come into action. By providing a slotted plate O', in which the lever I' oscillates, with notches P' it will be easy to adjust a slide-rod H', since when the lever I' is locked in one notch the platen will have been raised sufficiently for the middle types to act, while the locking of the lever I' in another notch will move the slide-rod so as to raise the platen into position for the top types to act. The lever I' may be held by a spring against the notches P', so as to prevent accidental dislocation of the platen.

The track G is readily made vertically adjustable in the supports C' by providing the track with rods or legs K', Fig. 3, which slide through eyes in arms L', extending from the supports C'. The dog L L, being pivoted to the track G, will rise and fall therewith, and by making the bearing B' of shaft M somewhat loose the end of said shaft which is secured to the dog will have sufficient vertical play to partake of the rise and fall of the dog L L.

The ink-ribbon Q', Figs. 1 and 4, passes from one of the rollers R' S' to the other, said ribbon being held extended by the tension-rollers T' T', mounted on the swinging arms U', which are forced apart by springs V'. The arms U' are pivoted at W' W' to the frame X'. The rollers R' S' are also journaled to the frame X' at W' W'. The frame X' is pivoted or hinged at Y' to one of the guides $n$, so that when the frame is down in the position shown in Fig. 2 the ribbon Q' is in the path of the type-bars and will be carried by a projected type-bar against the platen. The spring-pressed rollers T' allow sufficient yielding of the ribbon for the type-bars to force the ribbon against the platen. Upon the return of the type-bars the rollers T' extend the ribbon so as to carry it away from the platen. When the types are to be cleaned, the frame X' can be swung up about its pivots Y', so as to be out of the way during the cleaning.

The ribbon is unwound from one of the rollers R' S' onto the other roller, and is then wound back again to the first roller. This winding back and forth is accomplished as follows: Each of the rollers R' S' has secured to it or to its axle a ratchet $e'$, Figs. 6 and 7. A reciprocating arm $Z'$ has pawls $b'$ $c'$. The pawl $b'$ is adapted to engage one ratchet $e'$ and the pawl $c'$ the other ratchet $e'$. The arm $Z'$ is reciprocated by an arm $a'$, extending from the rock-shaft M into a suitable fork or recess on the arm $Z'$, Fig. 4.

In Fig. 7 the pawl $b'$ is shown as engaging a ratchet $e'$, while the pawl $c'$ is held out of engagement by a shield $d'$, interposed between said pawl $c'$ and its corresponding ratchet $e'$. This shield is one of a pair of shields $d'$ $d'$, secured to slide $h'$, having a link $i'$ provided with a pin $g'$, entering into a screw-thread or screw-drum $f'$ on the axle of one of the rollers $R'$ $S'$. In the drawings the roller $S'$ is shown as having its axle provided with a screw-thread. As the roller $S'$ rotates, by the ribbon being drawn therefrom, the pin $g'$ rides along said screw-thread, and when one end of the screw-thread is reached the pin $g'$, with its link $i'$ and slide $h'$, is pushed along, so that a shield $d'$ forces the pawl $b'$ out of action, and the other shield $d'$ passes out from between pawl $c'$ and its ratchet, Fig. 6. The ribbon is now wound up on roller $S'$ and drawn from roller $R'$ as the pawl $c'$ actuates said roller $S'$ upon the reciprocation of arm $Z'$. When the pin $g'$ now reaches the other end of screw-thread $f'$, the link $i'$ and the slide $h'$ are drawn back to the position shown in Fig. 7, whereby the pawl $c'$ is forced out of action and the pawl $b'$ is allowed to come into action, so that the ribbon is now wound up on roller $R'$ and drawn from roller $S'$ by the reciprocations of the arm $Z'$. The ribbon is thus kept moving back and forth.

The arm $Z'$ and slide $h$ are held in place by the heads of screws or rivets $k'$, Fig. 1, adapted to move in slots in the frame $X'$.

As some of the keys $s$ have their finger-buttons placed farther into the machine than other keys, the fulcra of the inner button-keys are placed farther into the machine than the fulcra of the outer button-keys, so as to obtain an equal leverage for all the keys and to equalize the force required to depress the several keys. The fulcra are indicated by $l'$, and springs $m'$ restore the keys to the starting-point when the keys are released. These springs can be arranged in any suitable well-known way. I have found it convenient to secure each spring to an outer fulcrum $l'$ and to brace said spring against an inner fulcrum. By causing the free end of each spring to press upon a stud secured to the inner arm of the corresponding key or key-lever $s$ said inner arm will be depressed as soon as the finger-button of the key is released, thus raising the outer arm of the key-lever with the finger-button to the starting-point. When the end of a line is reached, an alarm $n'$, Fig. 3, is struck by a hammer $o'$, secured to the platen-carriage at any suitable point. The alarm $n'$ is adjustably secured to the side of the track G, so that said alarm can be set more or less in one direction or another to be struck sooner or later, as the written lines are to be longer or shorter. A slot $q'$, into which enters the supporting-stem $p'$ of the alarm, allows the alarm to be adjusted.

To prevent the platen being pressed backward, said platen has arms $r'$ hinged to a rod $s'$, supported upon legs or supports $t'$. The arms $r'$ can slide along the pivot or hinge-rod $s'$, so that the platen can travel along in a linear direction, and said platen is also free to rise and fall, but the arms $r'$ brace the platen against backward pressure or vibration, such as caused by the impact of the type-bars on the platen.

Instead of connecting the keys $s$ and levers $q$ $r$ by pin-and-slot connections, as shown in Fig. 8, a gear connection, as shown in Fig. 10, can be used.

The ribbon-roller frame $X'$ may be provided with a pointer $u'$, so as to indicate when the platen has been set to the desired starting-point. The spacing-key is restored to the starting-point by springs $v'$. To prevent rattling or noise when the type-bar returns, a rubber pad $w'$ may be secured to the guides $n$ to deaden the noise of such return.

What I claim as new, and desire to secure by Letters Patent, is—

1. In a type-writing machine, the combination of concentric guides arranged in two tiers and converging to a common point, the upper and lower type-bars adapted to slide in said guides, a rotary platen, and a vertically-movable support for said platen, substantially as described.

2. In a type-writing machine, the combination, with type-bars provided with two or more types and suitable guides, in which said bars move, of a vertically-movable platen and bracing-arms $r'$ for holding said platen against backward motion, said arms $r'$ being jointed to a suitably-supported bar or pivot $s'$, substantially as described.

3. In a type-writing machine, the combination, with concentric guides arranged in two tiers and made to converge toward a common point, and type-bars made to slide in said guides and each provided with two or more types, of a rotary platen, a vertically-movable support for said platen, and bracing-arms for holding said platen against backward motion, substantially as described.

4. In a type-writing machine, the combination, with the type-bars, the rotary platen, the frame D, in which the platen is mounted, and the ratchet $f$ and pawl $d$ for rotating said platen, of the plate $k$, supported by the frame D and provided with a curved slot $i$, the pointer $g$, loosely mounted on the axle of the platen, the shield $l$, carried by the pointer and arranged to control the engagement of the pawl and ratchet, and the set-screw $h$, supported in the slot $i$ to adjustably clamp the pointer and shield, substantially as described.

5. In a type-writing machine, the combination, with the platen, the platen-carriage, and the hammer $o'$, secured to said carriage, of the platen-carriage track having the slot $q'$, and the adjustable alarm-bell $n'$, having its stem $p'$ supported in said slot, substantially as described.

6. In a type-writing machine, the combination, with the platen, the platen-carriage, and a feed-rack and dog for said platen-carriage, said rack provided with the vertically-inclined slots O O, of the slide Q, having studs P P engaging said slots, a lever or handle for actuating the slide, and the spring R, attached to the platen-carriage and having one end engaged with the slide, substantially as described.

7. In a type-writing machine, the combination, with the platen, the platen-carriage, and a feed-rack and dog for said platen-carriage, of the slide Q for raising said feed-rack out of its operating position, the vertically-inclined slot-and-pin connection O P for connecting said slide and rack, a lever and connections for actuating the platen and slide together, and a lever for actuating the slide independent of the platen, substantially as described.

8. In a type-writing machine, the combination, with an ink-ribbon and feed-rollers R′ S′ for said ribbon, of ratchets actuated by pawls $b'$ $c'$, alternating shields $d'$ $d'$ for putting first one and then the other pawl out of operation, a slide $h'$ for actuating said shields, a link $i'$, connected to said slide and provided with a pin $g'$, and a screw-thread $f'$, engaged by said pin and connected to one of the feed-rollers, substantially as described.

9. In a type-writing machine, the combination, with the platen, the type-bars, the inking ribbon, and the feed-rollers R′ S′ for said ribbon, of the ribbon-roller frame X′, provided with pivoted arms U′ and pointer $u'$, the tension-rollers T′, and the springs V′, substantially as described.

10. In a type-writing machine, the combination, with a platen and a vertically-adjustable track for said platen, of a bell-crank and slide H′ for raising and lowering said track, an actuating-lever I′ for said slide, and a setting-plate having engaging notches for fixing the lever I′ in the desired position, substantially as described.

11. In a type-writing machine, the combination, with the platen, the feed-rack and dog, and the rock-shaft M, having arms $z$, of the spacing-key $t$, extended along under the key-levers, and the rock-shafts $w$, having arms $v$ and $x$ for connecting the spacing-key with the arms of said rock-shaft, substantially as described.

12. In a type-writing machine, the combination, with the key-levers $s$ and the type-bars $m$, of the levers $q$, pivotally supported at their lower ends, the links $p$, connecting said levers with the type-bars, and the levers $r$, connecting the type-bar levers $q$ with the key-levers, substantially as described.

13. In a type-writing machine, the combination of an ink-ribbon, feed-rollers for said ribbon, pawls $b'$ $c'$ for actuating said rollers, an arm or slide Z′ for actuating the pawls and a rock-shaft M for actuating the slide Z′, and a spacing-key and restoring-spring $v'$ for actuating the rock-shaft, substantially as described.

In testimony whereof I have hereunto set my hand in the presence of two subscribing witnesses.

B. T. MULLIGAN.

Witnesses:
 WM. C. HAUFF,
 E. F. KASTENHUBER.